United States Patent [19]

Steyert, Jr. et al.

[11] 4,340,405

[45] Jul. 20, 1982

[54] APPARATUS AND METHOD FOR MAINTAINING LOW TEMPERATURES ABOUT AN OBJECT AT A REMOTE LOCATION

[75] Inventors: William A. Steyert, Jr.; William C. Overton, Jr., both of Los Alamos, N. Mex.

[73] Assignee: The United States of America as represented by the United States Department of Energy, Washington, D.C.

[21] Appl. No.: 202,041

[22] Filed: Oct. 29, 1980

[51] Int. Cl.$^3$ ............................................. F25B 19/00
[52] U.S. Cl. .................................. 62/514 R; 62/437; 165/80 E; 165/185
[58] Field of Search ................. 62/514 R, 437, 62, 45, 62/383; 165/80 E, 185

[56] References Cited

U.S. PATENT DOCUMENTS

| | | | |
|---|---|---|---|
| 2,871,675 | 2/1959 | Cornelius | 62/437 |
| 3,007,596 | 11/1961 | Matsch | 62/45 |
| 3,882,687 | 5/1975 | Asztalos et al. | 62/514 R |

OTHER PUBLICATIONS

NASA Tech. Brief 65-10289, "Boron Nitride Housing Cools Transistors," Sep. 1965.
Justice et al., "Thermophysical Properties of the Lanthanide Oxides I," J. Phys. Chem. 67, 339, (Feb. 1963).
Justice et al., "Thermophysical Properties of the Lanthanide Oxides II," J. Phys. Chem. 67, 345, (Feb. 1963).
Westrum, Jr., "Thermophysical Properties of the Lanthanide Oxides III," J. Phys. Chem 67, 659, (Mar. 1963).
Overton, Jr., "Feasibility of Detecting Artificial Magnetic Anomalies in Hydrofractured Rock by Superconducting Gradiometer-SQUID Systems," Los Alamos Scientific Laboratory Report LA-6626-MS, (Dec. 1976).
Rosenblum et al., "High Specific Heat Metals for Use in Superconducting Composites," IEEE Trans. on Magnetics *MAG-13*, No. 1, 834, (Jan. 1977).

*Primary Examiner*—Ronald C. Capossela
*Attorney, Agent, or Firm*—Robert W. Weig; Paul D. Gaetjens; Richard G. Besha

[57] ABSTRACT

The disclosure is directed to an apparatus and method for maintaining a body at cryogenic temperatures at a remote location such as down a borehole for an extended period of time. A housing contains a body comprising a material having a high specific heat at cryogenic temperatures such as between about 2 and 15 K. The body contains an orifice for containing an instrument or instruments operable at superconducting temperatures. The apparatus is precooled at the surface and lowered into a borehole to a desired depth, such as 2 to 3 miles. The instruments are operated, and the apparatus withdrawn, the material of the body maintaining the very low temperatures at which the instrument(s) operate for a sufficient period of time at the remote or downhole location. The material may comprise a rare earth compound, such as $Gd_2O_3$, $Gd_2Se_3$, $Gd_2O_2S$ or $GdAlO_3$. Monoclinic and C-phase gadolinium oxides work well. A low temperature is maintainable at a remote location for several hours.

13 Claims, 1 Drawing Figure

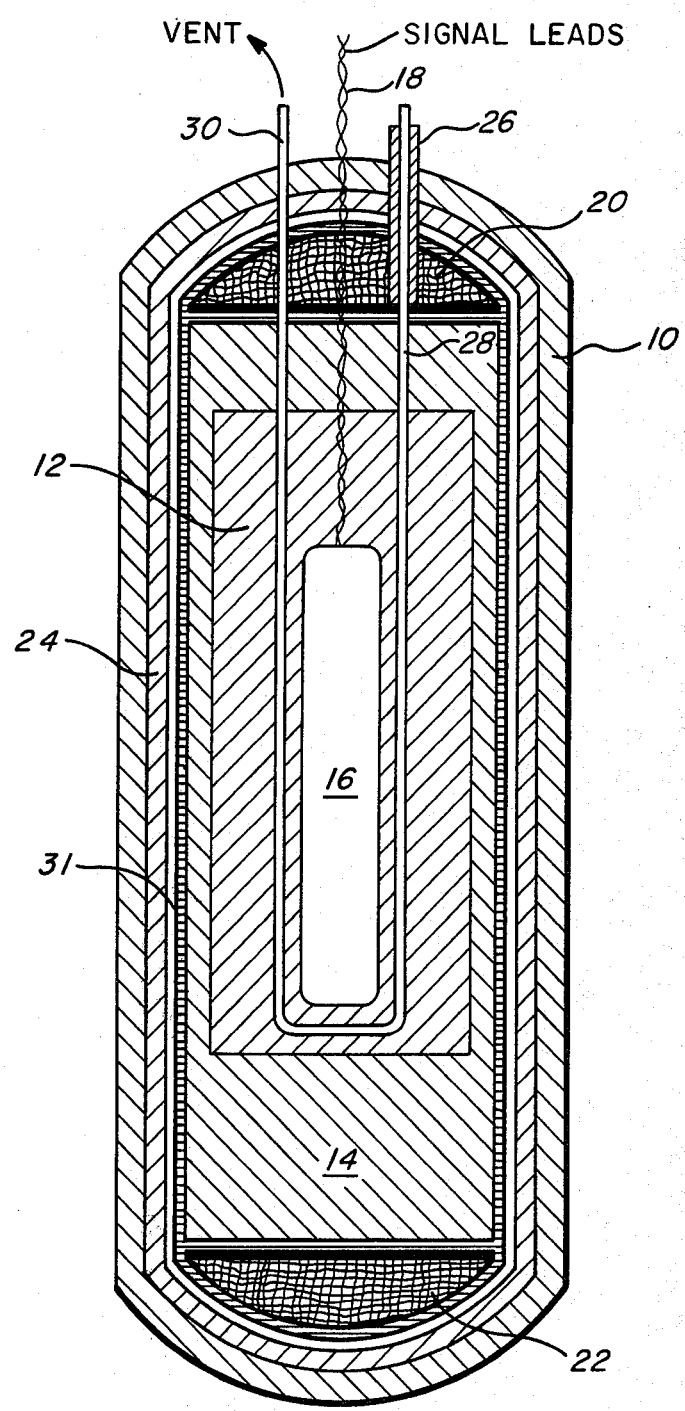
Figure

APPARATUS AND METHOD FOR MAINTAINING LOW TEMPERATURES ABOUT AN OBJECT AT A REMOTE LOCATION

This invention is a result of a contract with the Department of Energy (Contract No. W-7405-ENG-36).

BACKGROUND OF THE INVENTION

The invention relates to structures and methods for maintaining objects at low temperatures at remote locations and more particularly to an apparatus and method for maintaining a low temperature about an object at a remote location for an extended period of time.

It is desirable to log boreholes in order to determine and physical properties of the rocks such as porosity and flow permeability. It is sometimes also desirable to determine the nature of cracks, fractures, and fissures in the rocks. Nuclear magnetic resonance systems are sometimes used to log boreholes for permeability and porosity. The performance of such nuclear magnetic resonance systems is enhanced by the use of a cryogenic environment. Superconducting gradiometers and magnetometers used in borehole logging would require such an environment. Data from such measurements can be used to determine potential fluid flow such as for geothermal steam or water through the fracture.

In logging boreholes it is frequently necessary to maintain a cryogenic temperature between about 2 and about 15 K. for an extended period of time, such as 3 to 6 hours, about a cryogenic instrument disposed in a borehole to enable it to be lowered up to a distance of 2 to 3 miles and operated at such a distance downhole for a sufficient period of time to make any desired measurements. Usually the instrument need not be maintained at a cryogenic temperature during withdrawal from the borehole.

One attempted procedure involved the use of a downhole closed-cycle refrigerator. The system was precooled at the surface, a cryogenic temperature being maintained downhole by running a conduit to and a vent from a liquid helium dewer. Needless to say, this was very cumbersome and very high pressure downhole precluded proper downhole venting of the helium. This technique is essentially too complex to manage for borehole depths on the order of 2 to 3 miles although it is workable in shallow boreholes.

SUMMARY OF THE INVENTION

One object of the present invention is to provide a cryogenic temperature environment for a logging instrument at a remote location for an extended period of time.

Another object of the invention is to minimize coolant plumbing about super cooled cryogenic devices operated at remote locations.

In accordance with the present invention there is provided an apparatus and method for maintaining cryogenic temperatures about an object at a remote location for an extended period of time. The apparatus comprises a housing enclosing a body comprising a compound having a high specific heat at cryogenic temperatures, such as $Gd_2O_3$, $Gd_2Se_3$, $Gd_2O_2S$, and $GdAlO_3$. The body contains an orifice for receiving the object to be cooled. The body is precooled to a cryogenic temperature, such as at least about 3 to 4 K. for a body comprising $Gd_2O_3$, by a conduit containing a super coolant such as liquid helium. The housing is lowered down a borehole or placed at a remote location after the body therein and therefore the object which it surrounds is reduced to a cryogenic temperature. Due to its exceptionally large specific heat at a cryogenic temperature, the composition of the body maintains a cryogenic temperature about the object which it cools for an extended period of time, such as on the order of 3-6 hours.

One advantage of the present invention is that an instrument operable only at cryogenic or superconductive temperatures can be operated at a remote location in accordance therewith without an operating refrigeration system accompanying it.

Another advantage of the present invention is that the apparatus in accordance therewith is conveniently portable.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawing, which is incorporated in and form a part of the specification, illustrates an embodiment of the present invention and, together with the description, serve to explain the principles of the invention. In the drawings:

The FIGURE provides a cross sectional view of a preferred embodiment of the invention.

DETAILED DESCRIPTION OF A PREFERRED EMBODIMENT OF THE INVENTION

Reference is now made to the FIGURE which shows a preferred embodiment of an apparatus in accordance with the present invention. The apparatus comprises a housing 10 which surrounds a body 12 comprising, for example, monoclinic $Gd_2O_3$, although other materials may be used.

Other usable materials comprise gadolinium compounds such as $Gd_2Se_3$, $Gd_2O_2S$, $GdAlO_3$, and C-phase $Gd_2O_3$. A preferred body comprises monoclinic $Gd_2O_3$ having an antiferromagnetic ordering temperature of about 4 K. Antiferromagnetic ordering temperatures for the other above rated exemplary compounds are as follows: $Gd_2Se_3$, about 6 K.; $Gd_2O_2S$ about 5.7 K.; $GdAlO_3$, about 3.7 K.; and C-phase $Gd_2O_3$, about 2.5 K. Other usable materials will be apparent to those skilled in the art who will recognize that potential materials will have (1) a high density of magnetic ions because magnetic ions are responsible for the specific heat characteristics desired to practice the invention, and (2) antiferromagnetic transition in the about 2 to about 15 K. temperature region because magnetic characteristics would affect the instrument to be operated at such cryogenic or superconductive temperatures. Those skilled in the art will appreciate rare earth compounds where magnetic electrons are not in the outer shell offer good possibilities as usable materials. Rare earths have low ordering temperatures even at high densities because responsible electrons are not in the outer shells of their atoms. In rare earths magnetic electrons are 4 f's, their 5 s and 5 p shells being nonmagnetic and shielding the 4 f's from interacting with each other until low temperatures are reached.

Between body 12 and housing 10 is preferably disposed a layer of superinsulation in a vacuum 14, such as carbon-loaded getter-paper alternated with aluminized plastic superinsulation. Alternatively, a gas getter such as activated charcoal powder can be used instead of the getter-paper. For logging uses where a magnetometer or gradiometer is to be utilized it is desirable that all of the components of the housing and superinsulation be nonmagnetic. In cases where it is not necessary for high frequency electromagnetic signals to enter to leave the tool, berylliumcopper is a suitable material for the housing 10.

Logging instrumentation (not shown) is enclosable in body 12 within a cavity or orifice having wall 16. The instrumentation may be contained in a metal shield housing which is then disposed within the orifice. The instrumentation is connected to the surface through signal leads 18. Coils that may radiate radio frequency waves into rock formations may be disposed in a vacuum space between a layer of aluminized superinsulation 24 and a thermally conductive cylinder 31 which serves to connect the two ice packs 20 and 22. The coils may alternatively be disposed in superinsulation 14 about the instrumentation in the orifice. The additional layer of aluminized superinsulation 24 or other thermal isolator is preferably provided between the housing 10 and the superinsulation 14 to protect body 12 from heat external to housing 10. Cylinder 31 protects the instrumentation from high temperatures of the borehole and serves to carry the cooling effect of the venting gas to freeze the lower ice pack 22 during precooling at the surface.

The device is cooled to the desired cryogenic temperature, such as about 2.5 K. for a body comprising $Gd_2O_3$, by a flow of helium through a vacuum insulated liquid helium cooling tube 26. The liquid helium passes through a conduit 28 preferably comprising thin walled stainless steel tubing in order to cool body 12 down to a cryogenic temperature. A vent 30 allows liquid helium which has passed through the body out of the housing. The helium may be pumped out of the vent to reduce its temperature. Helium vapors passing through vent 30 freeze the ice 20. Pressure seals and screw-down top caps with electrical connectors to a logging cable, the possible configurations of which are well known to those skilled in the art (not shown), prevent any high pressure downhole fluids from entering the cooling tube.

In the preferred embodiment the body comprises monoclinic or fused $Gd_2O_3$. The preferred use of $Gd_2O_3$ is based on its very high specific heat in the 2.5 to 4.5 K. temperature range. The $Gd_2O_3$ comprised body acts as a very low temperature heat sink with its exceptionally large specific heat, averaging 0.45 $J/cm^3$—K. between 2.5 and 4.5 K. A two liter volume of $Gd_2O_3$ precooled to 3 K. before lowering it into a hostile borehole environment can provide a temperature environment below 4.5 K. for an object encased therein for several hours. This is sufficient time for the instrument to enter the borehole and make the required measurements. In typical applications no damage is done to either the apparatus or, more importantly, the borehole if the system heats up during its removal from the borehole as the apparatus contains no cryogenic fluids. Thus, there is no potential spillage of cryogenic fluids in practicing the invention.

If it is desirable to get lateral transmission of radiofrequency radiation into rock formations and out of the logging tool, a nonconducting pressure vessel or housing must be used. For borehole temperatures up to about 450 K., a fiberglass wound epoxy filled tube is suitable. Above that temperature, a reinforced polyimide such as Vespel or Kapton, trademarks of the E. I. duPont Nemours Co. may be used. A ceramic such as $Al_2O_3$ might also be utilized. In addition, aluminized Mylar superinsulation, a trademark of the Eastman Kodak Company, which has frequent vertical cuts in its aluminum coating to avoid eddy current shielding of the radiation may be used.

High density monoclinic $Gd_2O_3$ can be prepared from commercially available C-phase $Gd_2O_3$ by heating the $Gd_2O_3$ to about 2300° C. in an induction furnace. Liquid $Gd_2O_3$ is an electrical conductor and thus suitable for induction melting. However, it is preferable to add a consumable graphite or gadolinium metal button to the oxide to provide electrical conduction until some of the oxide melts. It is also preferable to melt the oxide in air to avoid loss of $O_2$ from the $Gd_2O_3$.

In operation, the instrumentation is inserted into the orifice of body 12 at the surface. The body and therefore the instrument therein are then super cooled by conducting a super coolant such as liquid helium through cooling tube 26 into the housing where it passes through conduit 28 within the body. It is then passed from the housing through vent 30. The liquid helium is circulated through body 12 until the desired cryogenic temperature is reached, such as about 2.5 K. At this point the housing is lowered into the borehole, possibly to a depth of 2 to 3 miles, which is the depth of many geothermal boreholes.

The instrument is then operated downhole for as long as necessary and is retrieved from the borehole during which time its temperature may increase above superconducting temperatures. However, since the instrument usually is not functionally dependent upon being maintained at superconducting temperatures when it is inoperative, the raising of its temperature during its removal from a borehole is not harmful to the instrument because it is not being operated.

The preferred embodiment of the device is designed for use in environments having temperatures up to about 600 K. It will maintain its temperature below about 4.5 K. for at least about three hours and up to about 6 hours in such an environment.

The foregoing description of a preferred embodiment of the invention has been presented for purposes of illustration and description and is not intended to be exhaustive or to limit the invention to the precise form disclosed. It was chosen and described in order to best explain the principles of the invention and their practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for maintaining cryogenic temperatures about an object for an extended period of time in a remote location comprising:
    a housing;
    a body comprising a material having a high specific heat at cryogenic temperatures disposed within said housing, said body comprising an orifice for receiving said object; and means for conducting cryogenic coolant to said body to lower its temperature to at least about 2 to about 15 K.

2. The invention of claim 1 further comprising a layer of superinsulation disposed between said housing and said body.

3. The invention of claim 1 wherein said body comprises a rare earth material.

4. The invention of claim 1 wherein said body comprises a gadolinium compound.

5. The invention of claim 1 wherein said body comprises monoclinic gadolinium oxide.

6. The invention of claim 1 wherein said body comprises C-phase gadolinium oxide.

7. The invention of claim 1 wherein said body comprises a compound selected from the group consisting of $Gd_2O_3$, $Gd_2Se_3$, $Gd_2O_2S$ and $GdAlO_3$.

8. The invention of claim 1 wherein said body comprises fused $Gd_2O_3$.

9. The invention of claim 1 wherein said cryogenic coolant conducting means comprises a conduit for a liquid gas disposed within said body, means for passing liquid gas through said housing into said conduit and means for venting said conduit.

10. The invention of claim 1 wherein said liquid gas comprises liquid helium.

11. The invention of claim 1 wherein said housing is at least partially lineable with ice.

12. The invention of claim 1 wherein said housing is substantially lined with aluminized superinsulation.

13. The invention of claim 1 wherein said housing comprises a pressure vessel.

* * * * *